(12) United States Patent
Mundschau et al.

(10) Patent No.: US 7,947,116 B2
(45) Date of Patent: May 24, 2011

(54) HYDROGEN SEPARATION PROCESS

(75) Inventors: Michael Mundschau, Longmont, CO (US); Xiaobing Xie, Foster City, CA (US); Carl Evenson, IV, Lafayette, CO (US); Paul Grimmer, Longmont, CO (US); Harold Wright, Longmont, CO (US)

(73) Assignee: Eltron Research & Development, Inc., Boulder, CO (US)

( * ) Notice: Subject to any disclaimer, the term of this patent is extended or adjusted under 35 U.S.C. 154(b) by 927 days.

(21) Appl. No.: 11/671,344

(22) Filed: Feb. 5, 2007

(65) Prior Publication Data
US 2008/0000350 A1    Jan. 3, 2008

Related U.S. Application Data

(60) Provisional application No. 60/765,524, filed on Feb. 6, 2006.

(51) Int. Cl.
*B01D 53/22* (2006.01)
(52) U.S. Cl. .................. 95/55; 95/45; 95/56; 96/4; 96/7; 96/8; 96/10; 96/11; 55/524; 423/651; 423/652; 423/655
(58) Field of Classification Search ............... 95/45, 54, 95/55, 56; 96/4, 7, 8, 10, 11; 55/524; 48/61, 48/76, 63, 127.7, 127.9, 197 R, 198.3, DIG. 5; 422/187, 188, 189, 193, 198, 211; 423/650, 423/651, 652, 655; 429/12, 17, 19, 20
See application file for complete search history.

(56) References Cited

U.S. PATENT DOCUMENTS
3,350,846 A * 11/1967 Makrides et al. ................ 95/56
(Continued)

OTHER PUBLICATIONS

Mundschau, M. V., et al.; "Dense Inorganic Membranes for Production of Hydrogen from Methane and Coal With Carbon Dioxide Sequestration"; Eltron Research, Inc., 4600 Nautilus Court South, Boulder, CO USA.

Mundschau, M.V., et al.; "Hydrogen Transport Membrane Technology for Simultaneous Carbon Dioxide Capture and Hydrogen Separation in a Membrane Shift Reactor"; Carbon Dioxide Capture for Storage in Deep Geologic Formation; vol. 1, Chapter 16; Elsevier Ltd. 2005; pp. 291-306.

(Continued)

*Primary Examiner* — Jason M Greene
(74) *Attorney, Agent, or Firm* — Conley Rose, P.C.

(57) ABSTRACT

A method for separating a hydrogen-rich product stream from a feed stream comprising hydrogen and at least one carbon-containing gas, comprising feeding the feed stream, at an inlet pressure greater than atmospheric pressure and a temperature greater than 200° C., to a hydrogen separation membrane system comprising a membrane that is selectively permeable to hydrogen, and producing a hydrogen-rich permeate product stream on the permeate side of the membrane and a carbon dioxide-rich product raffinate stream on the raffinate side of the membrane. A method for separating a hydrogen-rich product stream from a feed stream comprising hydrogen and at least one carbon-containing gas, comprising feeding the feed stream, at an inlet pressure greater than atmospheric pressure and a temperature greater than 200° C., to an integrated water gas shift/hydrogen separation membrane system wherein the hydrogen separation membrane system comprises a membrane that is selectively permeable to hydrogen, and producing a hydrogen-rich permeate product stream on the permeate side of the membrane and a carbon dioxide-rich product raffinate stream on the raffinate side of the membrane. A method for pretreating a membrane, comprising: heating the membrane to a desired operating temperature and desired feed pressure in a flow of inert gas for a sufficient time to cause the membrane to mechanically deform; decreasing the feed pressure to approximately ambient pressure; and optionally, flowing an oxidizing agent across the membrane before, during, or after deformation of the membrane. A method of supporting a hydrogen separation membrane system comprising selecting a hydrogen separation membrane system comprising one or more catalyst outer layers deposited on a hydrogen transport membrane layer and sealing the hydrogen separation membrane system to a porous support.

49 Claims, 8 Drawing Sheets

U.S. PATENT DOCUMENTS

| | | | |
|---|---|---|---|
| 4,468,235 A * | 8/1984 | Hill | 95/56 |
| 4,496,373 A * | 1/1985 | Behr et al. | 95/56 |
| 5,013,437 A * | 5/1991 | Trimmer et al. | 95/55 |
| 5,215,729 A * | 6/1993 | Buxbaum | 95/56 |
| 5,393,325 A * | 2/1995 | Edlund | 95/56 |
| 5,412,866 A | 5/1995 | Woith et al. | |
| 5,827,569 A | 10/1998 | Akiyama et al. | |
| 5,989,319 A * | 11/1999 | Kawae et al. | 96/11 |
| 6,152,987 A * | 11/2000 | Ma et al. | 95/56 |
| 6,168,649 B1 * | 1/2001 | Jensvold et al. | 95/54 |
| 6,461,408 B2 * | 10/2002 | Buxbaum | 95/55 |
| 6,572,679 B2 * | 6/2003 | Baker et al. | 95/55 |
| 6,702,878 B2 * | 3/2004 | Ito et al. | 96/11 |
| 6,899,744 B2 | 5/2005 | Mundschau | |
| 7,001,446 B2 | 2/2006 | Roark et al. | |
| 2004/0129135 A1 | 7/2004 | Roark et al. | |
| 2005/0005765 A1 * | 1/2005 | Siadous et al. | 95/45 |
| 2005/0061145 A1 | 3/2005 | Alvin et al. | |
| 2005/0241477 A1 | 11/2005 | Mundschau et al. | |

OTHER PUBLICATIONS

Andersen, Henrik; "Pre-Combustion Decarbonisation Technology Summary"; Carbon Dioxide Capture for Storage in Deep Geologic Formations; vol. 1, Chapter 11; Elsevier Ltd.; 2005; pp. 203-211.

Ohrn, Ted R., et al.; "Design, Scale Up and Cost Assessment of a Membrane Shift Reactor"; Carbon Dioxide Capture for Storage in Deep Geologic Formations; vol. 1, Chapter 18; Elsevier Ltd.; 2005; pp. 321-339.

Judkins, Roddie R., et al.; "Scale-Up of Microporous Inorganic Hydrogen-Separation Membranes"; Proceedings of Pittsburg Coal Conference; Sep. 1005; 13 pages.

Balachandran, U. (Balu), et al.; "Current Status of Dense Cermet Membranes For Hydrogen Separation"; Proceedings of Pittsburg Coal Conference; Sep. 2005; 7 pages.

International Search Report dated Oct. 1, 2007 for PCT/US2007/061684.

* cited by examiner

HYDROGEN SEPARATION PROCESS

CROSS-REFERENCE TO RELATED APPLICATIONS

This application claims benefit from provisional application Ser. No. 60/765,524 filed Feb. 6, 2006, which is hereby incorporated herein by reference in its entirety for all purposes as if reproduced in full below.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DOE Contracts No. DE-FC26-00NT40762, DE-FC26-05NT42469, DE-FG02-04ER83934, DE-FG02-04ER83935, and DE-FG02-05ER84199 awarded by the Department of Energy.

BACKGROUND OF THE INVENTION

1. Field of the Invention

This disclosure relates to a method of separating hydrogen from a hydrogen-containing stream using a hydrogen separation membrane system. More particularly, this disclosure relates to a method of separating a stream consisting essentially of hydrogen from impure hydrogen streams at temperatures greater than about 200° C. through the employment of a hydrogen separation membrane system.

2. Background of the Invention

Methods of producing hydrogen and carbon monoxide include steam reforming, gasification, or partial oxidation of natural gas, petroleum, coal, biomass, and municipal waste. Production of hydrogen from these sources is accompanied by production of carbon dioxide, carbon monoxide, and other gases. It is highly desired to separate hydrogen from these side-products and gaseous contaminants.

One currently used well-known and established method to separate $H_2$ from impurities (i.e., other gases) is Pressure Swing Adsorption ("PSA"). PSA uses multiple beds, usually two or more, of solid adsorbent to separate impure $H_2$ streams into a very pure (99.9%) high pressure product stream and a low pressure tail gas stream containing the impurities and some of the hydrogen. For example, synthesis gas ($H_2$ and CO) may be introduced into one bed wherein everything but the hydrogen is adsorbed onto the adsorbent bed. Ideally, just before complete loading, this adsorbent bed is switched offline and a second adsorbent bed is placed online. The pressure on the loaded bed is subsequently reduced, which liberates the raffinate (in this case largely $CO_2$) at low pressure. A percentage of the inlet hydrogen, typically 10 to 20 percent, is lost in the tail gas. Greater recovery means more $CO_2$ and CO in the $H_2$ product stream.

PSA is currently generally the first choice for steam reforming $H_2$ plants because of its combination of high purity, modest cost, and ease of integration into the hydrogen plant. It is often used for purification of refinery off gases, where it competes with other kinds of membrane systems. One of the major disadvantages of this type system is that it operates at about 38° C. (100° F.). This entails a loss of thermal efficiency because the entire gas stream must be cooled prior to introduction into the pressure swing adsorption beds.

As the earth continues to warm, focus has been placed on effective methods for capturing and sequestering $CO_2$ (a "greenhouse gas") which has theoretically been linked to this warming trend. PSA is not advantageous from this standpoint, because the raffinate (i.e. tail gas) is produced at low pressure. Thus, if $CO_2$ is to be captured from the system, large amounts of $CO_2$ must be compressed from nearly atmospheric pressure to greater than 1000 psig. This compression from atmospheric pressure to 1000 psi can consume about $1/7^{th}$ the total energy of the feed (e.g., coal). The critical pressure needed to liquefy $CO_2$ for convenient transport and sequestration is 73.9 bar (1071 psi). Pressures well in excess of this (greater than 2000 psi) are required, however, to force the $CO_2$ into oil wells or other underground storage sites.

Another disadvantage of PSA is that low raffinate pressure essentially limits the system to a single stage of water gas shift, WGS, which is often used to convert CO to $CO_2$ and to produce additional hydrogen from synthesis gas streams. Limiting a hydrogen separation system to a single stage of WGS decreases the amount of CO conversion as well as the $H_2$ recovery. PSAs are also undesirable compared to filters and membranes, due to mechanical complexity, which leads to higher capital and operating expenditures and, potentially, increased downtime.

Accordingly, an ongoing need exists for a process to separate hydrogen that does not require cooling of the feed stream prior to separation and decreases or eliminates compression requirements of separation products.

BRIEF SUMMARY OF SOME OF THE PREFERRED EMBODIMENTS

Disclosed herein is a method for separating a hydrogen-rich product stream from a feed stream comprising hydrogen and at least one carbon-containing gas, the method comprising: feeding the feed stream, at an inlet pressure greater than atmospheric pressure and a temperature greater than 200° C., to a hydrogen separation membrane system comprising a membrane that is selectively permeable to hydrogen, and producing a hydrogen-rich permeate product stream on the permeate side of the membrane and a carbon dioxide-rich product raffinate stream on the raffinate side of the membrane. The method may be used to produce a hydrogen-rich permeate product stream that is greater than 99% by volume hydrogen. In embodiments, the carbon dioxide-rich raffinate product stream has a pressure greater than 400 psig. Suitable membranes for carrying out the method are also disclosed. In embodiments, the membrane is a composite membrane comprising a hydrogen transport layer. The membrane may further comprise one or more outer catalyst layers. The hydrogen transport layer may be acid etched prior to deposition of the one or more catalyst outer layers thereon. In some embodiments, the membrane is a three layer membrane comprising a hydrogen transport layer, a hydrogen dissociation catalyst outer layer on the raffinate side of the membrane and a hydrogen desorption catalyst outer layer on the permeate side of the membrane. In embodiments, the hydrogen dissociation catalyst outer layer and the hydrogen desorption catalyst outer layer comprise different materials. In embodiments, the hydrogen dissociation catalyst outer layer and the hydrogen desorption catalyst outer layer comprise different thicknesses. In embodiments, the hydrogen dissociation catalyst outer layer and the hydrogen desorption catalyst outer layer comprise different materials and different thicknesses.

In some embodiments, the membrane has a total thickness of from about 50 micrometers to about 1000 micrometers. The one or more catalyst outer layers may have thicknesses of from about 1 nm to 1500 nm. The hydrogen transport layer may comprise a metal selected from the group consisting of V, Nb, Ta, Zr and alloys thereof. Optionally, the hydrogen transport layer may comprise a material selected from the group consisting of cermets and proton conducting ceramics. A suitable hydrogen transport layer comprises about 90% V and about 10% Ni. The at least one outer catalyst layer may comprise a metal selected from the group consisting of Pd and alloys thereof, such as alloys of palladium with a metal selected from the group consisting of Ag, Cu, Au and Pt. In embodiments, the outer catalyst layer retains catalytic activity for feed streams comprising up to 20 ppm S. In embodiments, the membrane has a selectivity to hydrogen of greater than 99%.

The feed stream comprising hydrogen and at least one carbon-containing gas from which a hydrogen-rich product stream is separated via the disclosed method may comprise hydrogen and carbon dioxide and, in some embodiments, the hydrogen recovery is greater than 70% by volume. Alternatively, the hydrogen recovery is greater than 90% by volume. The feed stream will often, of course, comprise other gases, such as carbon monoxide and water (steam). At least one component of the feed stream may be separated out of the feed stream prior to feeding the feed stream to the hydrogen separation membrane system. Components removed from the feed stream prior to introduction to the hydrogen separation membrane system may be selected from surface catalyst poisons and water, for example.

The feed stream may be a water gas shift reaction mixture comprising hydrogen, carbon monoxide and carbon dioxide. The carbon dioxide-rich product raffinate stream may feed into a water gas shift reactor. If desirable, the carbon dioxide-rich product raffinate stream may be recycled to the hydrogen separation membrane system.

In some variations of the method, the hydrogen separation membrane system has a hydrogen flux through the membrane of greater than 20 mL/min/cm$^2$ at standard temperature and pressure. Some embodiments exhibit a hydrogen flux through the membrane of greater than 50 mL/min/cm$^2$ at standard temperature and pressure.

The hydrogen-rich permeate product stream has a hydrogen partial pressure of at least 20 psig, and the carbon dioxide-rich raffinate product stream has a total pressure of at least 200 psig in certain embodiments. The operating temperature of the hydrogen separation system may be in the range from about 200° C. to about 500° C. The operating temperature range may be from about 300° C. to about 400° C.

The membrane system is sometimes operated in the range of from about 300 psig to about 1000 psig and the pressure on the permeate side of the membrane is in the range of from about 0 psig to about 1000 psig. In alternative embodiments, the membrane system is operated in the range of from about 300 psig to about 1000 psig and the pressure on the permeate side of the membrane is in the range of from about 100 psig to about 500 psig. In some embodiments, where the pressure on the permeate side of the membrane is greater than 100 psig, the hydrogen flux through the membrane is greater than 20 mL/min/cm$^2$.

The hydrogen separation membrane system of the present disclosure may not require a permeate side sweep gas. Sometimes, however, especially when the product is to be combusted, an inert permeate side sweep gas is employed.

In embodiments, the method comprises feeding the carbon dioxide-rich product raffinate stream to a second hydrogen separation membrane system comprising a second membrane that is selectively permeable to hydrogen, and producing a second hydrogen-rich permeate product stream on a permeate side of the second membrane and a second carbon dioxide-rich product raffinate stream on a raffinate side of the second membrane. Still further, the second carbon dioxide-rich product raffinate stream may be further processed in a third hydrogen separation membrane system comprising a third membrane that is selectively permeable to hydrogen.

The feed stream comprising hydrogen and at least one carbon-containing gas may be obtained by reacting a carbonaceous feed with an oxidant to produce a first product stream comprising hydrogen and carbon monoxide at a pressure of above 200 psig; and reacting the first product stream with a water-containing stream to produce the feed stream, wherein the feed stream comprises hydrogen, carbon monoxide and carbon dioxide at a temperature of from about 200° C. to about 500° C. The carbonaceous feed may be selected from the group consisting of: natural gas, coal, petroleum coke, biomass and petroleum derived liquid fuel. Also disclosed herein is a method of integrating a water gas shift and hydrogen separation systems wherein a water gas shift reaction used in the production of the feed stream is integrated in a unit whereby reacting the first product stream with a water-containing stream to produce the feed stream and feeding the feed stream, at a pressure above atmospheric pressure, to a hydrogen separation membrane system are carried out in a singular reactor. The method integrating the WGSR and the hydrogen separation may enable conversion of carbon monoxide in the singular reactor of greater than 82%.

Also disclosed herein is a method of supporting a hydrogen separation membrane system comprising selecting a hydrogen separation membrane system comprising one or more catalyst outer layers deposited on a hydrogen transport membrane layer and sealing the hydrogen separation membrane system to a porous support. In embodiments, the composite hydrogen separation membrane system comprises a hydrogen transport layer comprising a metal selected from the group consisting of V, Nb, Ta, Zr and alloys thereof; and at least one catalyst outer layer comprising a metal selected from the group consisting of Pd and alloys thereof. The porous support comprises a material selected from the group consisting of porous metal, porous refractory ceramic, metal mesh screen and combinations thereof. In certain embodiments, the porous support is a tube and the membrane encircles the porous support tube. Alternatively, the porous support is planar. In some embodiments wherein the membrane is supported on a porous support, the hydrogen transport layer has a thickness of less than 100 µm.

Also disclosed herein is a method for pretreating the membrane, the pretreating comprising: heating the membrane to a desired operating temperature and desired feed pressure in a flow of inert gas for a sufficient time to cause the membrane to mechanically deform; decreasing the feed pressure to approximately ambient pressure; and optionally, flowing an oxidizing agent across the membrane before, during, or after deformation of the membrane. The oxidizing agent used may be air.

Further disclosed herein is a method for pretreating a membrane, comprising: heating the membrane to a desired operating temperature and desired feed pressure in a flow of inert gas for a sufficient time to cause the membrane to mechanically deform; decreasing the feed pressure to approximately ambient pressure; and optionally, flowing an oxidizing agent across the membrane before, during, or after deformation of the membrane.

The foregoing has outlined rather broadly the features and technical advantages of the present disclosure in order that the detailed description that follows may be better understood. Additional features and advantages of the apparatus and method will be described hereinafter that form the subject of the claims of this disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the apparatus and method as set forth in the appended claims.

BRIEF DESCRIPTION OF THE DRAWINGS

For a detailed description of the preferred embodiments of the methods of the present disclosure, reference will now be made to the accompanying drawings in which.

DETAILED DESCRIPTION OF THE PREFERRED EMBODIMENTS

Figure 1:
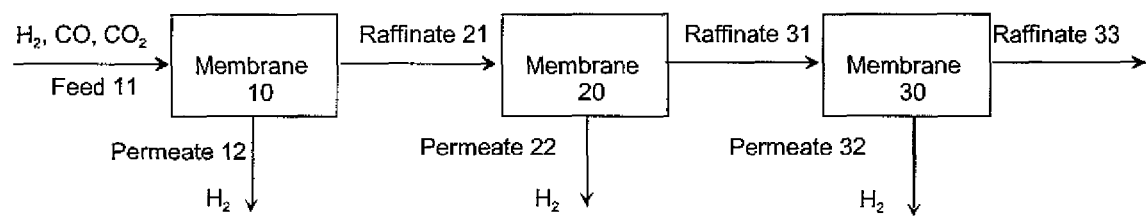
FIG. 1 is a schematic of an embodiment of the method of the present disclosure comprising three stages of hydrogen separation with a membrane reactor system.

The following description is intended to include non-limiting examples of specific embodiments of the disclosed invention. The term hydrogen transport membrane is used herein to refer to a membrane comprising a hydrogen transport layer and optionally one or more catalyst outer layers as discussed hereinbelow.

Herein disclosed is a method for the separation of hydrogen from a hydrogen-containing stream using a hydrogen separation membrane system, hereinafter HSMS. The method is useful in numerous industrial processes that produce hydrogen in, for example, a mixture of other gases. In embodiments, the hydrogen separation membrane system can be used directly in process systems without the need for additional steps to lower the gas pressure or temperature before the hydrogen separation step. In embodiments, the disclosed method minimizes or eliminates the additional costly and time-consuming step of compressing the hydrogen or other gases which are separated. In embodiments, the method of the present disclosure offers a means for economic sequestration of $CO_2$.

In embodiments, the method for separating hydrogen from a carbonaceous feed gas comprises the use of an integrated water gas shift-hydrogen transport membrane reactor, IWGSMR. In embodiments, the IWGSMR increases hydrogen production, lowers unit hydrogen production costs, and/or reduces the costs associated with $CO_2$ capture and compression when compared with conventional water gas shift and separation processes.

The method disclosed may comprise pretreating hydrogen separation membranes to enable the membranes to withstand higher pressures (for example, higher hydrogen partial pressures) than previously possible.

In specific embodiments, the methods of this disclosure can be employed for separation of hydrogen from various hydrogen-containing gases to produce purified hydrogen (e.g., separated from other gases in the hydrogen source), gas mixtures enriched in hydrogen (e.g., hydrogen in an inert gas), a gas stream from which undesirable hydrogen has been removed, or hydrogen for further reaction. In embodiments, the hydrogen-containing gas from which hydrogen is removed comprises, for example, water-gas shift mixtures, reformed petroleum products, or reformed methane, butane, methanol, ethanol or ammonia.

Hydrogen produced via the herein disclosed method may be used in any fashion as is known in the art. In embodiments, the separated hydrogen is very pure, i.e. greater than 99% by volume hydrogen. In embodiments, the separated hydrogen permeate is greater than 99.9% by volume hydrogen. In embodiments, the separated hydrogen permeate is greater than 99.99% by volume hydrogen. In various embodiments, hydrogen produced by these methods can, for example, be transported to another reactor for reaction to make desired products including methanol and hydrocarbon fuels. Alternatively, hydrogen can be reacted with a hydrogen-reactive gas within the reactor directly after transport. In an embodiment, the reactive gas is oxygen, and the products water and energy.

In an embodiment, a feed stream comprising hydrogen and at least one carbon-containing gas is fed, at a pressure greater than atmospheric pressure, to a hydrogen separation membrane system comprising an inorganic membrane whereby a hydrogen-rich product stream (permeate) and a carbon dioxide-rich product stream (raffinate) are produced. The term "permeate" is used herein to indicate the hydrogen-rich stream from the hydrogen separation membrane. The term "raffinate" is used to indicate at least a portion of the stream remaining after separation of at least some of the hydrogen from the hydrogen separation membrane.

In embodiments, the permeate pressure is from 0 psig to 1000 psig. In embodiments, the raffinate pressure is from 0 psig to 1000 psig. In some embodiments the permeate pressure is greater than 50 psig, in others greater than 100 psig, and still others greater than 200 psig. In embodiments, the membrane system is operated at from about 200° C. to about 500° C. In certain embodiments, further described hereinbelow, wherein an inert permeate side sweep stream is used, the permeate pressure may be the same as the feed pressure. In certain embodiments, wherein a permeate side sweep stream is used, the permeate pressure is the same as the raffinate pressure.

The hydrogen separation membrane used in the methods of this disclosure is generally incorporated in a reactor, as known in the art. In embodiments, the methods comprise the use of a hydrogen separation membrane reactor as one stage in a process. Alternatively, the methods can comprise the use of more than one hydrogen separation reactor in series or in parallel in a process. The hydrogen separation membrane and reactors incorporating such membranes described herein can be used in the processes described herein, as well as other processes, as known in the art. Methods of constructing the hydrogen separation membrane system and incorporating the hydrogen separation membrane system into a process are known to one of ordinary skill in the art using the disclosure herein and knowledge available to one of ordinary skill in the art.

In embodiments, the method comprises multiple stages of the hydrogen separation membrane system, HSMS. In one example of a multiple-stage process, one hydrogen separation membrane reactor is used to separate one portion of the hydrogen from a feed stream, a second membrane reactor is placed in series in the process and separates another portion of the hydrogen from a stream, and so on. In the multiple-stage process, each stage can have a different inlet and output pressure. In embodiments, the permeate at each stage is essentially pure $H_2$. Impurities can be present from imperfect seals, piping degassing, and other sources, as known in the art. In an alternative embodiment, raffinate from one hydrogen separation membrane reactor can be recycled back into the same reactor, for a continuous process.

FIG. 1 is a schematic of an embodiment of the method of the present disclosure comprising three stages of hydrogen separation with a membrane reactor system. Feed stream 11 comprising hydrogen and at least one carbon-containing gas ($CO$ and $CO_2$ in FIG. 1) is fed into a first hydrogen separation membrane stage 10. Permeate 12 from hydrogen separation membrane stage 10 consisting essentially of pure hydrogen exits at a pressure of greater than 200 psig, for example. Permeate 12 may comprise, for example, about 50% of the hydrogen in feed stream 11. Raffinate 21 is sent to a second hydrogen separation membrane stage 20, wherein a permeate stream 22 is separated. Permeate stream 22 may have a pressure of, for example, 100 psig and comprise, for example, about 35% of the hydrogen in feed stream 11. Raffinate 31 is sent to third hydrogen separation membrane stage 30 wherein it is separated into raffinate 33 and permeate 32. Permeate 32 may be, for example, at a pressure of about 20 psig and may contain, for example, 15% of the hydrogen in feed stream 11. Different numbers of stages are also envisioned in alternative embodiments.

In multiple-stage embodiments permeate streams are pulled off at different pressures. In embodiments, each stage is operated at inlet pressures of from about 300 psig to about 1000 psig. In embodiments, the permeate pressures on each stage can be operated independently and can range from about 20 psig to about 200 psig. In embodiments, at least one of the permeate pressures is above atmospheric pressure. In embodiments, the permeate consists essentially of pure hydrogen. In embodiments, the hydrogen flux across the hydrogen separation membrane is in the range from 10 mL/min/cm$^2$ to about 500 mL/min/cm$^2$. Alternatively, the flux across the hydrogen separation membrane is in the range from 50 mL/min/cm$^2$ to about 200 mL/min/cm$^2$.

In embodiments, each hydrogen permeate in the multi-stage reactor embodiment exits the reactor at a pressure greater than atmospheric pressure. The percentage of $H_2$ pulled off at each pressure can be adjusted by the membrane surface area, for example. If more $H_2$ is desired to be removed at a stage, the membrane surface area is increased. The pressures of the permeates can be adjusted by means known in the art, including back pressure regulators and control valves.

In embodiments of the present disclosure, the hydrogen separation membrane system does not require a permeate sweep gas (i.e., an inert gas to sweep hydrogen out of the reactor). In embodiments, a hydrogen partial pressure of greater than 20 psig can be used (without a sweep gas) on the permeate. In an embodiment of the multi-stage membrane system, greater than 30% of the total hydrogen product in a water gas shift reactor outlet stream is recovered at output pressures greater than 150 psig. In certain embodiments, a sweep is used such that the partial pressure of hydrogen is lower on the permeate side of the membrane. When a sweep is used, the total permeate pressure can be the same as the feed or the raffinate pressure as long as the partial pressure of hydrogen is lower on the permeate side as is known to those of skill in the art. In embodiments, the sweep gas is steam. Alternatively, the sweep gas is nitrogen.

The methods of the present disclosure are particularly suitable for feed streams comprising outlet streams from water gas shift reactors, WGSRs. Subsequent to the production of synthesis gas (i.e. 'syngas'; $H_2$+CO) additional hydrogen is often produced and carbon monoxide converted to carbon dioxide via the exothermic water gas shift reaction, WGSR:

$$H_2O(g)+CO \rightleftharpoons H_2+CO_2; \Delta H=-41.1 \text{ kJ mol}^{-1}. \quad (1)$$

In embodiments, the methods of the present disclosure are used to separate hydrogen from a water gas shift ("WGS") gas mixture comprising $H_2$, CO, $CO_2$, $H_2O$ and optionally other gases via a hydrogen separation membrane system with high (greater than 99%) selectivity to hydrogen removal. The WGS reaction raises exit temperatures of high-temperature water-gas shift reactors typically to between 360° C. to 440° C., depending upon the age and activity of the catalysts used.

The synthesis gas introduced into the water gas shift reactor described by Equation 1 hereinabove may be produced by any means to one of skill in the art. Synthesis gas can be produced, for example, via reforming, gasification, or partial oxidation of natural gas, coal, petroleum coke, petroleum fractions such as diesel, biomass, or other carbonaceous feedstock.

Description of an embodiment of the present disclosure will now be made with reference to FIG. 2 which is a schematic of a system for producing very pure hydrogen from natural gas. At 50, prior to reforming, sulfur-containing odorants and other potential catalyst poisons are removed from pipeline natural gas feed stream 51. Natural gas clean-up system 50 may comprise conventional liquid absorbents operating at ambient or low temperatures.

Cleaned-up natural gas stream 61 is subsequently converted into synthesis gas according to any method known to one of skill in the art. Oxidant, e.g., oxygen, for the conversion may be obtained by any known methods, for example, via a cryogenic oxygen separation unit. In the embodiment shown in FIG. 2, catalytic membrane reactor comprising oxygen separation membrane 60 is used to create synthesis gas stream 71. By separating oxygen from the other components of air, oxygen transport membranes allow an efficient means for the production of synthesis gas ($H_2$+CO) from natural gas or coal, without diluting the product with nitrogen. In the embodiment of FIG. 2, cleaned natural gas stream 61 is mixed with steam and heated to 950° C. and passed over the fuel side of oxygen ion transport membrane 60. Concurrently, air stream 62 is heated to 950° C. and passed over the air side of oxygen separation membrane 60. As is known to those of skill in the art, natural gas is converted into synthesis gas in the oxygen transport membrane reactors by a combination of steam reforming and oxidation reactions which, under conditions above 900° C., overwhelmingly favor production of $H_2$+CO at equilibrium. Nitrogen stream 63 exits oxygen separation membrane 60 as stream 63, and is further handled as is known in the art. Heat exchanger 70 cools synthesis gas stream 71 from oxygen separation membrane 60 to about 320° C. Heat exchanger 70 may also serve to heat air stream 62, steam and natural gas 61 to the operating temperature of oxygen transport membrane reactor 60.

Synthesis gas stream 81 at a temperature of about 320° C. is sent to water-gas shift reactor 80. In WGSR 80 operating at between about 320° C. and about 440° C., the CO in synthesis gas stream 81 is reacted with additional steam 82 over water-gas shift catalysts to produce $CO_2$ and additional hydrogen. At hydrogen separation membrane system 90, hydrogen in permeate 92 is extracted through the hydrogen separation membrane at greater than 99% (in embodiments, essentially 100%) selectivity to produce hydrogen of sufficient purity for operation of proton exchange membrane fuel cells, for example. Raffinate 93 from hydrogen separation membrane 90 comprises sequestered $CO_2$. In embodiments, permeate 92 has a pressure greater than 100 psig.

In embodiments, the method of separating hydrogen from a carbonaceous feed stream comprises one or more WGS reactors in conjunction with a hydrogen separation membrane system.

Figure 2:
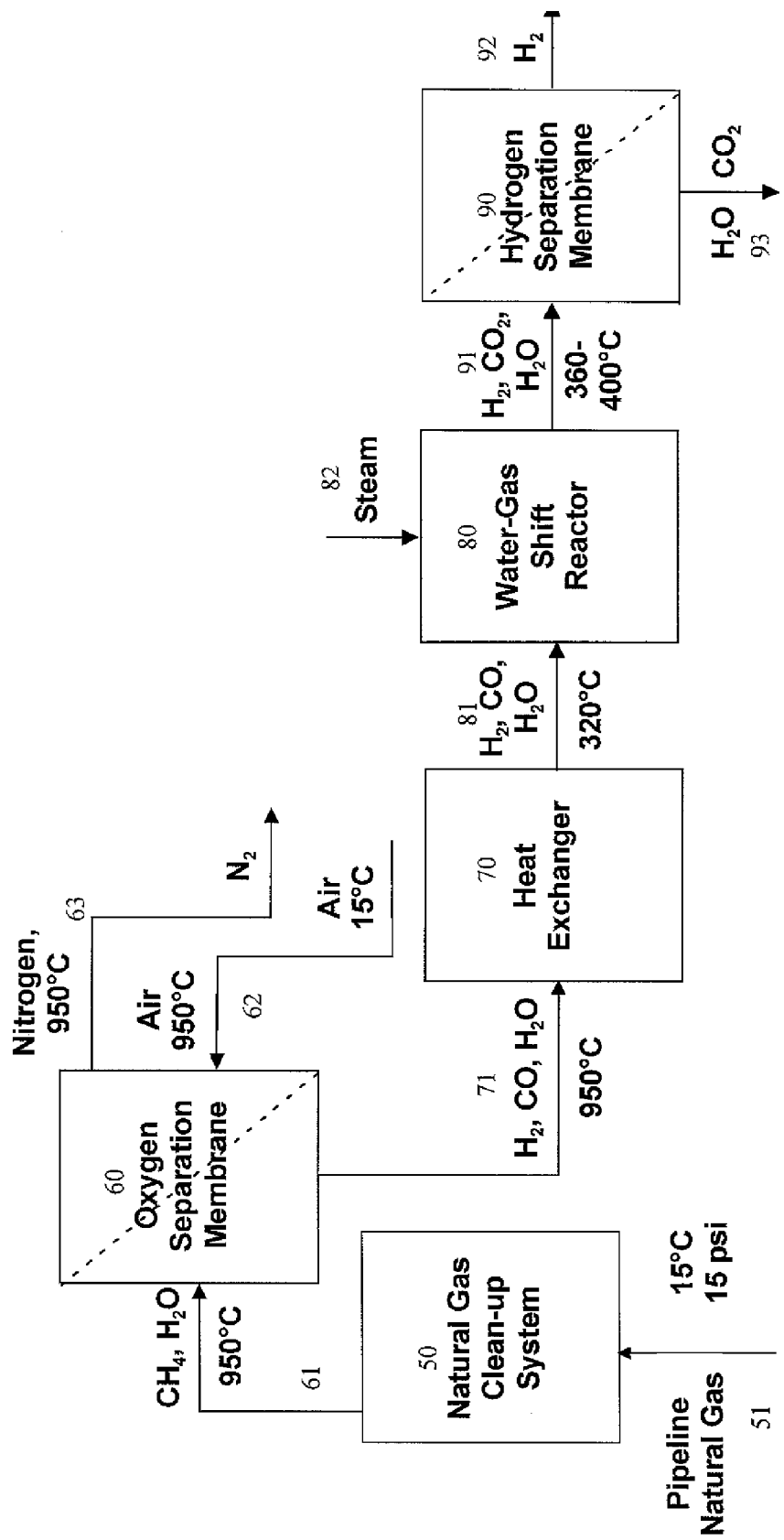
FIG. 2 is an exemplary process flow diagram according to the present disclosure for producing very pure hydrogen from natural gas.

In embodiments, the method of FIG. 2 is employed to produce electricity in remote sites where natural gas (or propane) is readily available but which is not connected to the electric power grid or for more efficient production of electricity at stationary residential or small business power sites operating on natural gas. In embodiments, nitrogen is used as an inert permeate side sweep gas and the hydrogen-rich permeate stream (comprising nitrogen) is combusted to produce electricity. When a nitrogen permeate side sweep stream is used, the nitrogen may be obtained by any means known. In embodiments, the nitrogen produced in the oxygen separation unit (for example, oxygen separation membrane 60) is used as the sweep gas. In embodiments, the nitrogen used for the sweep gas is produced via a cryogenic system air separation unit as known to those of skill in the art.

Figure 3:
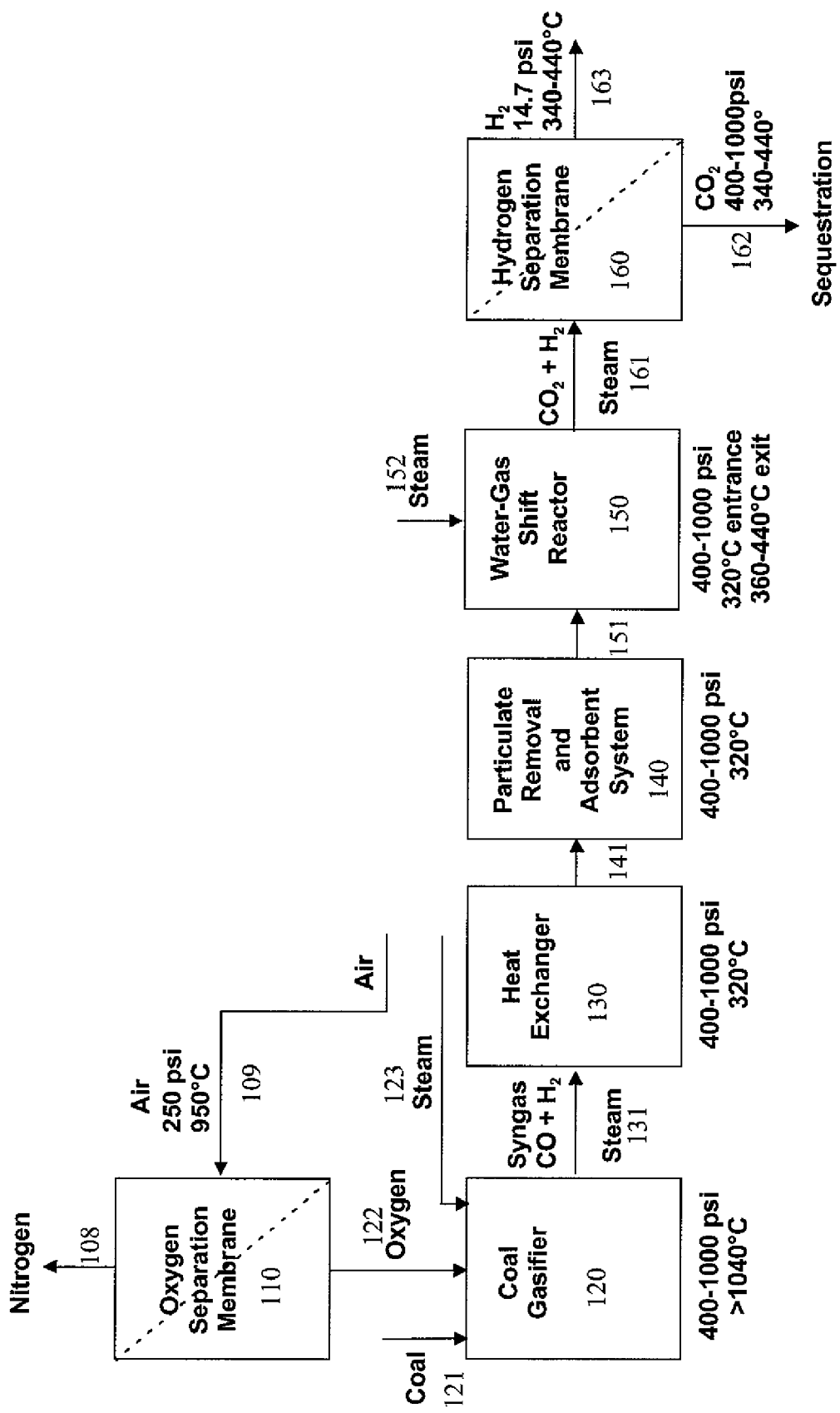
FIG. 3 is an exemplary process flow diagram for an embodiment of the present disclosure wherein oxygen transport membranes and hydrogen purification membranes are integrated with coal gasifier(s).

In an alternative embodiment, the method of the present disclosure may be used to produce hydrogen and sequester $CO_2$ downstream of a coal gasifier. Description of this embodiment will now be made with reference to FIG. 3 which is an exemplary process flow diagram for integrating both oxygen transport membranes and hydrogen purification membranes with coal gasifier(s).

Coal gasifier 120 operates at a temperature greater than 1040° C. and a pressure of from about 400 psi to 1000 psi (27.6 bar to 69.0 bar). Coal 121, oxygen 122, and steam 123 are reacted in coal gasifier 120 to produce syngas stream 131. In embodiments where $CO_2$ is to be sequestered following gasification of coal by steam and oxygen, oxygen separation units may be utilized to avoid diluting syngas product stream 131 with nitrogen. Any oxygen separation unit known to one of skill in the art may be utilized. In the embodiment shown in FIG. 3, oxygen transport membrane(s) 110 are used as the oxygen separation unit. Air at 950° C. at 109 is passed over oxygen separation membrane 110. Oxygen stream 122 is sent to coal gasifier 120, while nitrogen stream 108 is disposed of as is known in the art.

In an embodiment, gaseous reactants originating from coal are reacted with oxygen on the membrane fuel side surfaces and thus aid diffusion of oxygen through the membranes. Part of the carbon in coal (or its volatile components) is first steam reformed. Part of the hydrogen or the syngas stream is recirculated to the membrane (not shown in FIG. 3). As in the case of methane reforming, the $H_2$ (and to a lesser extent, CO) will react with the oxygen in the membrane surface to form steam and $CO_2$ plus heat. The hot steam and $CO_2$ from the membrane will then be fed back to coal gasifier 120 where the hot $H_2O$ plus $CO_2$ will react with the carbon in coal 121 to form $H_2$+CO stream 131. $H_2$ and CO are the favored equilibrium products under gasifier reaction conditions.

Syngas stream 131 at 400 psi to 1000 psi passes through heat exchanger 130 wherein the temperature of the syngas is reduced to the operating temperature of Particulate Removal and Adsorbent System 140 and subsequent WGSR 150. Heat exchanger 130 may also serve to recover much of the thermal energy and raise the temperature of steam 123, air stream 109, or oxygen 122, required for coal gasification. In embodiments in which hydrogen is to be the main product, it is desirable to use low-cost, commercial high-temperature water-gas shift catalysts. In embodiments, commercial catalysts based upon $Fe_3O_4/Cr_2O_3$ that typically operate with inlet temperatures near 320° C. depending upon catalyst age and activity, are utilized in WGSR 150. In an embodiment, syngas stream 131 emerging from coal gasifier 120 at greater than 1040° C. is cooled to 320° C. in heat exchanger 130. In an embodiment, exit stream 141 from heat exchanger 130 has a temperature of about 320° C.

Reduced-temperature syngas stream 141 may subsequently be sent to particulate removal and adsorbent system 140 to decrease the myriad of particulate matter which can originate from coal and to protect the bed of catalyst in WGSR 150. Any particulate removal system as is known in the art is sufficient. A fraction of the coal-derived impurities, which are volatile at 1040° C., will likely condense on the surface of the trapped particulates at 320° C. However, a warm-gas (320° C. to 340° C., for example for Cu/ZnO adsorbent) clean-up system containing high-surface area adsorbents such as Cu/ZnO or $ZnTiO_3$ to partially remove sulfur and other contaminants may be required to protect catalysts downstream.

Particulate decreased syngas stream 151 from particulate removal and adsorbent system 140 is reacted with steam 152 in WGSR 150. As discussed hereinabove, the WGS reaction converts CO to $CO_2$ and produces additional hydrogen. Conversion of CO to $CO_2$ is desirable to avoid separation of CO from sequestered product $CO_2$ at a later point.

WGSR exit stream 161 comprising $CO_2$ and $H_2$ is sent to hydrogen separation membrane 160. In embodiments, hydrogen separation membrane 160 exhibits greater than 99% selectivity for hydrogen removal. In embodiments, hydrogen separation membrane 160 exhibits essentially 100% selectivity for hydrogen removal. In embodiments, the pressure of hydrogen stream 163 is greater than 14.7 psi. In embodiments, the pressure of permeate 163 is from, for example, 14.7 psia to over 200 psia depending on the final desired use of the hydrogen.

In embodiments, WGSR exit stream 161 has a temperature of from about 360° C. to about 440° C. In embodiments, hydrogen separation membrane 160 is compatible with temperatures of approximately 360° C. to 440° C., as well as high pressure steam, $CO_2$, 3 mol % to 4 mol % residual CO which remains unconverted in high-temperature water-gas shift reactor 150 and residual impurities which escape the warm-gas clean-up system at 140 and the bed of water-gas shift catalyst in WGSR 150. In embodiments, permeate stream 163 exits hydrogen separation membrane 160 at a temperature of from 340° C. to 440° C. In embodiments, permeate stream 163 consists essentially of hydrogen.

As previously discussed, for $CO_2$ to be sequestered, it is desirable for hydrogen separation membrane 160 maintain $CO_2$ at (or near) the pressure of coal gasifier 120 to minimize downstream compression costs for $CO_2$. Coal gasifier 120 will typically operate at a pressure of 400 psi or 1000 psi (27.6 or 69.0 bar) and at a temperature greater than 1040° C. In embodiments, raffinate stream 162 has a temperature of from about 340° C. to about 440° C. In embodiments, raffinate stream 162 comprising $CO_2$ has a pressure of greater than 300 psig, alternatively greater than 400 psig, alternatively from 400 psi to 1000 psi.

In another embodiment, advantage is taken of the fact that the hydrogen separation membrane and the high temperature WGS catalyst are operable at the same temperature. In this embodiment, WGS and hydrogen separation are integrated into a single unit. In embodiments, the method of separating hydrogen from a carbonaceous stream comprises feeding the carbonaceous stream to an integrated WGS/hydrogen membrane reactor, hereinafter IWGSMR, producing a hydrogen-rich product stream and a carbon dioxide-rich product stream. In embodiments, the IWGSMR comprises a WGS catalyst in close proximity with a hydrogen separation membrane. In embodiments, the IWGSMR comprises more than one WGS catalyst bed. In embodiments, the IWGSMR comprises more than one HSM. Reactor modules comprising WGS catalyst bed(s) and hydrogen separation membrane(s) can be formed by any methods known to those of skill in the art.

Selection and optional pretreatments of WGS catalysts compatible with hydrogen transport membranes, methods of optimizing fluid dynamics, and operating parameters including composition and space gas velocity, temperature and pressure of the IWGSMR feed stream, and strategies of incorporating WGS catalyst(s) in close proximity with hydrogen transport membrane(s) may be performed as known by those of skill in the art upon reading this disclosure.

As can be seen by considering the WGS reaction, equation 1, removal of hydrogen as it is created shifts the reaction toward the conversion of more CO to yield more hydrogen and $CO_2$. By increasing the differential pressure across the membrane, more hydrogen is removed across the membrane and the equilibrium is pushed farther to the right. In embodiments, the integrated hydrogen transport membrane promotes the WGS reaction beyond the thermodynamic limitation, as is further discussed in Example 2 hereinbelow. In embodiments, the IWGSMR achieves a CO conversion of greater than the theoretical value of 81.1% based upon thermodynamic equilibrium without the removal of hydrogen via the membrane. In embodiments the IWGSMR enables a CO conversion of about 96%.

The integration of water gas shift and hydrogen separation into a single unit may reduce equipment size and/or capital costs for hydrogen production and $CO_2$ sequestration compared with conventional methods.

The procedure described herein can be used to separate $H_2$ from a gas mixture comprising $H_2$ and CO. The source of the $H_2$ and CO is not material to this embodiment; the membrane separation process described herein can be used with any process that produces a mixture of hydrogen and carbon dioxide (and optional other gases). The temperature and pressure under which the hydrogen separation membrane system described herein is used can be adjusted to the desired temperature and pressure of either the input stream, one or more output streams, or both, as known in the art and as described herein.

Although the above description assumes that the feed mixture passes directly to the multilayer nonporous membrane, in various embodiments, at least one component of the feed stream comprising hydrogen and at least one carbon containing gas is separated from the feed stream in a first separation process prior to introduction into the HSMS. In embodiments, nanoporous or microporous membranes are used as a first separation process prior to passing the feed stream to the membranes described herein. In embodiments, surface catalyst poisons are reduced or eliminated in a first separation process. In embodiments, some portion of water which may be present is removed in a first separation process.

The methods disclosed herein for the separation of hydrogen from carbonaceous gas streams comprise the use of hydrogen separation membranes. As further discussed hereinbelow, the hydrogen separation membrane comprises a hydrogen transport (bulk) layer that may be attached to one or more outer catalyst layers. Prior to use in a hydrogen separation process, these membranes may be pretreated. Wile not wishing to be bound by theory, the pretreatment process disclosed hereinbelow may minimize the mechanical stress the membrane undergoes under actual operating conditions and improve the lifetime of the membrane (e.g., minimize $H_2$ embrittlement and/or strengthen the membrane to withstand desired differential pressures across the membrane) and thus improve the performance of the membrane. A specific example of the pretreatment procedure is further discussed as Example 1 hereinbelow. Other specific useful process parameters, such as different reaction times, temperatures, membrane materials, pressures, and gases, are easily determined by one of ordinary skill in the art using the description provided herein without undue experimentation.

Figure 4:
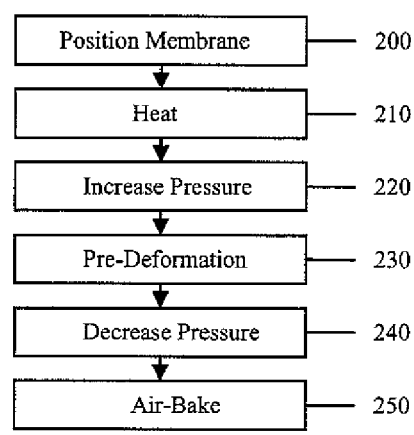
FIG. 4 is a flowchart of an embodiment of the pretreatment method of the present disclosure.

The pretreatment method of the present disclosure will now be discussed with reference to FIG. 4 which is a flowchart of an embodiment of the pretreatment method. At 200, composite hydrogen transport membrane, HTM, is positioned in a reactor, for example. The hydrogen transport layer of the composite HTM may be acid-etched prior to deposition of catalyst layer(s). As discussed hereinbelow, deposition of catalyst(s) may be performed by any means known to one of skill in the art. At 210, the HTM is heated to a desired operating temperature for a time under flowing inert gas at ambient pressure. In an embodiment, the HTM is heated to 400° C. for 12 hours. In embodiments, the inert gas is, for example, helium or argon. At 220, the feed side pressure is increased to a higher pressure. In an embodiment, at 220, the feed side pressure is increased to 450 psig over a period of about 30 minutes. At 230, the "pre-deformation" stage, the HTM is maintained at the higher pressure for a time. In embodiments, the pre-deformation comprises maintaining the HTM at the higher pressure for 15 minutes. After pre-deformation 230, the feed pressure is decreased at 240 to ambient pressure. In embodiments, the feed pressure is decreased at 230 to ambient pressure in about 10 minutes. At 240, an oxidizing agent is introduced to both sides of the membrane for a sufficient time to burn out any impurities that may have accumulated on the catalyst surface during the startup. This step is referred to as "air-baking." The surface catalyst activation step is optional, but may be useful in achieving higher hydrogen flux. The oxidizing agent may be air, oxygen, hydrogen peroxide, ozone, or others as known in the art. In embodiments, the HTM is air-baked for about 15 minutes. In embodiments, the HTM is air-baked prior to pre-deformation.

As discussed in Example 1 hereinbelow, membranes pretreated in this manner may be capable of sustaining 1000 psig of feed pressure and 450 psig of permeate pressure for over 12 hours without failure. Membranes used in the experiments described hereinbelow were pretreated as described above.

The disclosed methods for the separation of hydrogen from carbon dioxide or other gases comprise a hydrogen separation membrane that is selectively permeable to hydrogen. In embodiments, the hydrogen separation membrane is an inorganic membrane. In embodiments, the hydrogen separation membrane is non-porous. In embodiments, a porous membrane is incorporated into the physical structure of a multilayer membrane. In embodiments, the hydrogen separation membrane is prepared on porous substrates, as further described hereinbelow.

In embodiments, the hydrogen separation membrane is a multilayer membrane. In embodiments, the hydrogen separation membrane is a single-layer membrane. A suitable single-layer membrane is one or more metal-containing substances suitable for H transport ("H transport layer"). One side of the membrane is exposed to the feed composition ("feed exposed side" or "inlet"). Another side of the membrane is designated the permeate exposed side or output. If a multilayer membrane is used, one or more catalyst layers can be attached to either the feed exposed side or the permeate exposed side of the H transport layer. One or more catalyst layers can be incorporated into the H transport layer. "Attached" indicates the catalyst layers and the H transport layer are in sufficient physical proximity so that the system exhibits catalytic activity. Examples of attachment include vapor deposition or using an adhesive to attach a thin foil to the H transport layer, as is known in the art. "Layer" does not necessarily mean a uniform surface is present; there may be defects or portions with non-uniform thickness in a layer.

Hydrogen separation membranes which are useful in this invention include metal and metal alloy, cermet and ceramic compositions. Some useful membrane compositions and catalyst compositions and methods of making the same and methods of preparing systems incorporating the membranes are described in U.S. Pat. No. 6,899,744 and U.S. patent application publications 2004/0129135 and 2005/0241477, which are incorporated by reference to the extent not inconsistent with the disclosure herewith.

Figure 5:
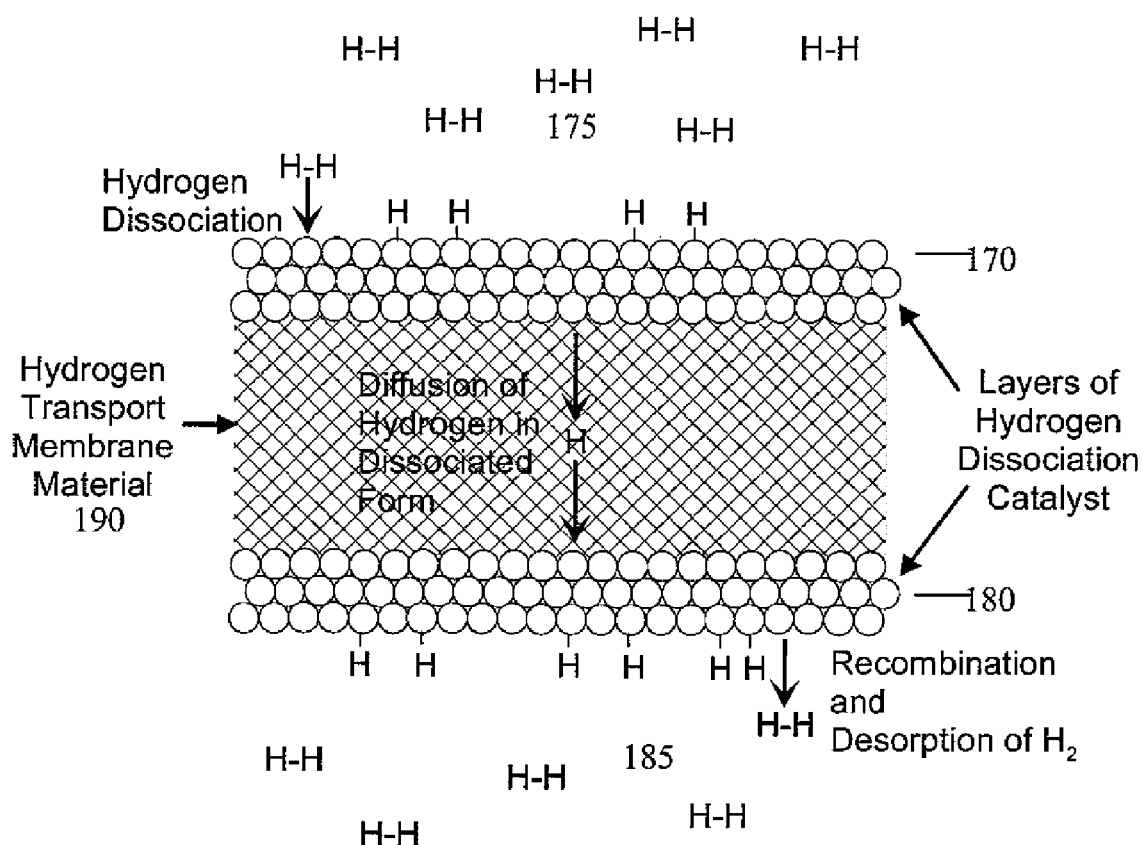
FIG. 5 is a schematic showing the role of hydrogen dissociation catalysts on both surfaces of dense hydrogen transport membranes which transport hydrogen in a dissociated form.

One example of a multilayer membrane contains three layers, although other numbers of layers can be used. All of the common dense hydrogen transport membranes, capable of essentially 100% selectivity for hydrogen, transport hydrogen in a dissociated form. FIG. 5 is a schematic showing the role of hydrogen dissociation catalysts on both surfaces of dense hydrogen transport membranes which transport hydrogen in a dissociated form. Molecular hydrogen, $H_2$, on the retentate side 175 of the hydrogen separation membrane diffuses to hydrogen dissociation catalyst layer 170 where it is catalytically dissociated on the retentate-side membrane surface to allow transport of hydrogen through the hydrogen transport membrane 190 in a dissociated form. Dissociated hydrogen diffuses through hydrogen transport membrane 190 to hydrogen desorption layer 180 where it is re-combined and desorbed from the permeate-side 185 membrane surface as $H_2$. Because hydrogen is transported in a dissociated form (i.e. as protons (H), hydride ions ($H^{1-}$), neutral atoms, or neutral proton-electron pairs), molecular hydrogen must be adsorbed and dissociated on the hydrogen feed (retentate) side of the membrane and recombined and desorbed on the hydrogen sink (permeate) side of the membrane.

Suitable catalyst systems include, but are not limited to, palladium, alloys of palladium (such as Pd—Ag and Pd—Cu), the superpermeable elements (such as niobium, tantalum, vanadium and zirconium and their alloys), cermets (ceramic-metals) fabricated by sintering together hydrogen permeable metals and ceramics, and the proton conducting ceramics.

Catalysts selection may be optimized for adsorption of hydrogen and resistance to impurities on the hydrogen source side (175), and optimized for desorption of hydrogen on the hydrogen sink side (185).

For elements such as palladium, which have intrinsic catalytic activity for the adsorption and dissociation of molecular hydrogen, no additional catalyst may be needed. Hydrogen transport membranes comprising composite membranes based upon elements such as Nb, Ta, V and Zr possess 10 to 100 times higher hydrogen permeability relative to unalloyed palladium. However, because these membrane materials rapidly form oxides, carbides and nitrides which poison the hydrogen dissociation reaction and block permeation of hydrogen, hydrogen dissociation catalysts, typically noble metal catalysts such as palladium and its alloys may be applied to both sides of the membrane. The hydrogen transport membrane layer may be acid etched prior to deposition of the catalyst(s). As mentioned hereinabove, hydrogen dissociation catalysts on the retentate surface should protect the underlying membrane materials from components of the feed and should be made resistant to the level of catalyst poisons remaining downstream from the water-gas shift or other reactors upstream. Catalysts on the permeate side should be optimized for hydrogen desorption.

Hydrogen dissociation catalysts and hydrogen desorption catalysts are metal (including alloys) and may be porous or non-porous. The catalyst may be a continuous layer or it may be composed of a plurality of catalyst islands (e.g., forming a discontinuous layer across the membrane surface). If non-porous, the catalyst layer must be hydrogen permeable. Catalyst layers include metals of the Group IB, VIIB and VIIIB and alloys thereof. Specific examples of catalysts include Pd, alloys of Pd, including Pd/Ag, Pd/Au, Pd/Pt and Pd/Cu alloys, Ni and Pt and alloys thereof. The metal can be present at a level between about 10 atomic % to 99 atomic %.

One example of a three-layer system uses a hydrogen dissociation catalyst as the feed exposed layer. In one embodiment the catalyst composition contains approximately 75 atomic % Pd. In one embodiment, the catalyst composition is 70 atomic % Pd:30 atomic % Cu. Other embodiments contain a ratio of from 99:1 to 1:1 of Pd:M, where M is another metal, along with all individual ratios and intermediate ranges therein.

The performance of multilayer composite membranes may be improved by replacing unalloyed palladium catalysts with palladium alloys or palladium intermetallic compounds. For example, palladium-silver alloys of the high flux composition, 75 atomic % Pd and 25 atomic % Ag, will enhance hydrogen diffusion through the catalytic layers and enhance hydrogen desorption on the membrane permeate side. Alloys of Pd—Cu, for example, or other sulfur tolerant alloys or intermetallic compounds on the membrane retentate surface, can be used to resist sulfur if present in the hydrogen feed.

The preparation of thin films of palladium-M (where M is another metal) alloys for use as hydrogen transport membranes is described extensively in the literature. Common methods for deposition of palladium-M alloys include, for example, sputtering, electroless deposition, and vapor deposition.

In the production of hydrogen from coal, management of impurities and potential catalyst poisons is important to success. In the presence of steam in the temperature range between 340° C. to 440° C., encountered in the exhaust of water-gas shift reactors, commercial adsorbents such as ZnO can at best reduce levels of $H_2S$ to about 2 ppmv to 10 ppmv. Levels of $H_2S$ can be predicted to escape guard beds of ZnO in the presence of steam at equilibrium for the reaction $H_2S+$ ZnO $H_2O+ZnS$. Hydrogen dissociation catalysts on surfaces of hydrogen transport membranes should be resistant to this level of $H_2S$ for optimum performance (e.g., permeation). Unalloyed palladium and conventional palladium-silver alloys appear to be especially vulnerable to poisoning by sulfur and are not recommended for use in hydrogen transport membranes exposed to compounds of sulfur. Other palladium alloys and intermetallic compounds which do not form bulk sulfides are important to production of sulfur-resistant hydrogen dissociation catalysts for use on hydrogen purification membranes. In embodiments, the dissociation catalyst layer is tolerant to 20 ppm S.

In embodiments, the permeate side layer comprises a hydrogen desorption catalyst that is selected from the same catalysts as the catalysts discussed hereinabove for use as hydrogen dissociation catalyst. In embodiments, both hydrogen dissociation and hydrogen desorption catalysts are used, and the hydrogen desorption catalyst is not the same material and/or thickness as the hydrogen dissociation catalyst. In embodiments, the hydrogen desorption catalyst is the same material and/or thickness as the hydrogen dissociation catalyst.

The H transport layer is a metal suitable for H ion transport. Preferred examples of H transport layers are V, Nb, Ta and alloys of these materials with other metals such as Ni, Fe, Co, Mo, Cu. A preferred H transport metal is V. V is useful for applications above 360° C., among other applications. One exemplary H transport alloy is 10% Ni with 90% V. The 10% Ni with 90% V H transport alloy is useful for applications below about 300° C., among other applications.

In specific embodiments, the hydrogen transport layer comprises a metal selected from the group consisting of vanadium, niobium, tantalum, titanium, zirconium, and alloys thereof, and particularly a metal selected from the group consisting of binary, ternary and higher order alloys of vanadium, niobium, tantalum, titanium, and zirconium with one or more different metals selected from vanadium, niobium, tantalum, titanium, zirconium, aluminum, cobalt, chromium, iron, manganese, molybdenum, copper, nickel, gallium, germanium, tin, silicon, tungsten, lanthanum, beryllium, hafnium, and mixtures thereof. All possible groupings of the materials listed herein are intended to be included as if they were listed separately. All possible individual materials listed herein are intended to be included as if they were listed separately. In embodiments, the hydrogen transport layer comprises a metal selected from the group consisting of vanadium, niobium, tantalum, zirconium and alloys thereof, alloys of vanadium, niobium, tantalum or zirconium with one or more metals selected from the group consisting of titanium, nickel, titanium, aluminum, chromium, iron and copper. In an embodiment, the hydrogen transport layer comprises a metal selected from vanadium and alloys of vanadium with one or more of nickel, aluminum, titanium and mixtures thereof. In one embodiment, the hydrogen transport layer includes alloys of vanadium with titanium and optionally one or more of nickel, and aluminum. In a specific embodiment, the hydrogen transport layer includes alloys of vanadium and titanium containing from about 1 to about 20 atomic % titanium (and all individual values and subranges thereof). In another specific embodiment, the hydrogen transport layer includes alloys of vanadium and nickel containing from about 1 atomic % to about 20 atomic % nickel (and all subranges thereof). In specific embodiments of the invention, the hydrogen transport layer is a hydrogen-permeable metal or metal alloy other than palladium or an alloy of palladium. In specific embodiments, the hydrogen transport layer is an alloy of a metal selected from the group consisting of vanadium, niobium, tantalum, and zirconium with one or more metals selected from the group consisting of titanium, aluminum, cobalt, chromium, iron, manganese, molybdenum, copper, nickel, gallium, germanium, tin, silicon, tungsten, lanthanum, beryllium, hafnium and mixtures thereof. Membrane alloys include those having from about 1 atomic % to about 50 atomic % of a metal selected from the group consisting of titanium, aluminum, cobalt, chromium, iron, manganese, molybdenum, copper, nickel, gallium, germanium, tin, silicon, tungsten, lanthanum, beryllium, hafnium, and mixtures thereof with a metal selected from the group consisting of vanadium, niobium, tantalum, and zirconium. Membrane alloys include those having from about 1 atomic % to about 25 atomic % of a metal selected from titanium, aluminum, cobalt, chromium, molybdenum and mixtures thereof with one or more metals selected from the group consisting of vanadium, niobium, tantalum, and zirconium. Membrane alloys include those having from about 5 atomic % to about 15 atomic % of a metal selected from titanium, aluminum, cobalt, chromium, molybdenum and mixture thereof with one or more metals selected from the group consisting of vanadium, niobium, tantalum, and zirconium. Alloys useful for membranes also include alloys of a metal selected from vanadium, niobium and tantalum with one or more metals selected from aluminum, titanium, cobalt, chromium, molybdenum and mixtures thereof. Additional alloys for membranes are alloys of vanadium with one or more metal(s) selected from the group consisting of titanium, aluminum, chromium and mixtures thereof. Membranes include alloys of vanadium with titanium and particularly those alloys containing from about 1 atomic % to about 50 atomic % titanium, those containing from 1 atomic % to about 25 atomic % titanium and those containing from about 5 atomic % titanium to about 15 atomic % titanium.

The membrane thickness can be any useful thickness which provides the desired hydrogen flux through the membrane and the desired strength to mechanical breakage. As known in the art, in general a thicker membrane will be more able to resist higher differential pressures across the membrane than a thinner membrane, but the flux through a thicker membrane is in general less than the flux through a thinner membrane. Typically, membranes with a thickness of between about 50 µm to about 1000 µm can be used in the present invention. In embodiments, a membrane thickness of over 50 µm is used. In one embodiment, a membrane thickness of between 50 µm to 500 µm is used. Alternatively, the membrane has a thickness of between 100 µm and 1000 µm. In specific embodiments, the membrane thickness is about 70 µm. Alternatively, the membrane has a thickness of about 137 µm.

Some useful thickness ranges for the catalyst layer(s) are between about 1 nm to 1500 nm and all individual values and all intermediate ranges therein, for each layer.

The hydrogen separation membrane system can be arranged in a planar or tubular arrangement as further discussed hereinbelow. In one example of a tubular arrangement, the hydrogen separation membrane is arranged in a tubular shape, with the feed gas flowing around or within the hydrogen separation membrane.

In various embodiments, as discussed hereinabove, a suitable hydrogen separation membrane for carrying out the disclosed methods is a multilayer membrane. In order to increase hydrogen flux through the multilayer membrane, an apparatus for carrying out the method of the present disclosure has been devised. The apparatus comprises a support which provides mechanical support to the hydrogen separation membrane system. The incorporation of such a support into the HSMS may enable the use of a thinner membrane and a concomitant increase in the hydrogen flux through the membrane. Membranes utilized without porous supports are generally thicker (and subsequently have lower hydrogen flux) in order to withstand the pressure differential (absolute and hydrogen partial pressure differential) encountered during operation. Use of inner membranes may also be economically desirable, as membrane materials (e.g., Pd) are often more costly than potential porous supports. The use of a supported multilayer membrane, SMM, may enable reduction of the costly hydrogen transport (bulk membrane) layer by up to 90% and may reduce membrane cost by about 75%.

In embodiments, a multilayer membrane of the present disclosure (e.g., a three layer membrane comprising a thicker hydrogen transport (bulk) layer approximately 100 µm to 500

μm thick and coated on each side with very thin catalyst outer layers approximately 0.1 μm thick) is fabricated in a planar assembly. The multilayer membrane may be placed in contact with a porous support. Suitable porous supports will provide structural support necessary to keep the multilayer membrane in place and prevent breakage when a pressure differential (e.g., 1000 psi) is applied across the assembly; the porous support should also have a porosity such that flux of gases (i.e., hydrogen) through the porous support is orders of magnitude greater than the flux of hydrogen through the multilayer membrane.

The porous support may comprise a material selected from metal mesh screens, porous metals, porous refractory ceramics, and combinations thereof. In embodiments, the porous support comprises a material selected from the group consisting of porous stainless steel and porous aluminas. Flow across the SMM is through the multilayer membrane and then through the porous support. Having the porous support "downstream" of the multilayer membrane provides mechanical support to the multilayer membrane as the pressure drop across the multilayer membrane presses it against the porous support.

An embodiment of the supported multilayer membrane, SMM, will now be described with reference to FIG. 6 which is a schematic of a tubular arrangement of SMM 300. In this embodiment, a thin hydrogen transport layer (e.g., preferably less than 100 μm thick layer of a metal from the group consisting of V, Ta, Ni, and alloys thereof) is coated on one or both sides with a very thin catalyst layer (e.g., less than 0.1 μm Pd or an alloy of Pd) in a planar assembly multilayer membrane. In this embodiment, multilayer membrane 320 is wrapped around the outside of support 310 which in this embodiment, is tubular. The use of a thin planar assembly multilayer membrane may aid in rolling the assembly around the support tube without breaking the membrane assembly or having the layers of the multilayer membrane separate during assembly of SMM, 300. Support tube 310 is porous beneath multilayer membrane 320 in region 311 downstream of the multilayer membrane and nonporous at each end region of the tube (one end region 312 shown in FIG. 6) extending just past the radial end seals (one radial end seal shown as 340 in FIG. 6) with multilayer membrane 320. That is, support tube 310 is nonporous beyond porous/nonporous interface 350 to enable sealing of multilayer membrane assembly 320 onto support tube 310. The rolled membrane assembly 320 is longitudinally sealed (e.g., by welding) at 330 to form a tight fit of membrane assembly 320 on support tube 310. In this embodiment, flow is from the outside to the inside of the porous support.

Multilayer membrane assembly 320 may be rolled into a tube and sealed pre- or post positioning adjacent support tube 310. Longitudinal seam 330 and radial end seals 340 between multilayer membrane assembly 320 and support tube 310 may be effected by any means known to one of skill in the art, for example, laser welding, affixing with sealant, compression fitting, welding covered by inert material, etc.

Figure 6:
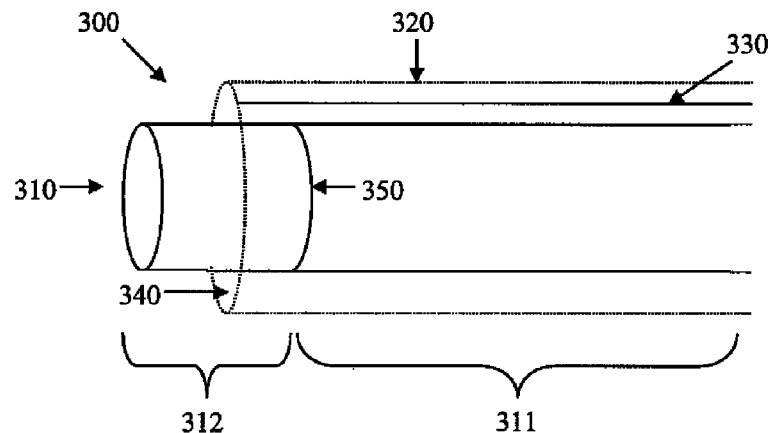
FIG. 6 is a schematic of a supported hydrogen separation membrane system of the present disclosure.

In an alternative embodiment to that shown in FIG. 6, multilayer membrane assembly 320 may be positioned within support tube 310. In this embodiment, multilayer membrane assembly 320 may be manufactured as a tube with a slightly smaller diameter than the diameter of support tube 310, positioned within support tube 310 and radially sealed at the ends as described above. This configuration potentially enables the use of higher pressure differentials, because flow in this embodiment is from the inside of support tube 310 to the outside of support tube 310 and tubes generally exhibit greater burst strength than collapse strength.

In a further embodiment of the SMM, a planar configuration is employed, wherein a planar support, having nonporous edges to which the multilayer membrane is sealed, is positioned "below" the multilayer membrane (i.e., downstream). In planar embodiments, flow may be vertical or horizontal as long as the planar multilayer membrane assembly is at the inlet and the planar support is at the outlet.

In any of the configurations just described, the multilayer membrane assembly must seal against the support. Thus, in tubular arrangements, support tube 310 must be porous downstream of multilayer membrane assembly 320 and nonporous at the point of the end seals and outside of the seals. In the embodiment of FIG. 6, for example, multilayer membrane 320 is either manufactured as a tube of slightly larger diameter than the diameter of support tube 310 and slid over the porous support, or manufactured as a planar assembly and subsequently rolled over support 310 and longitudinally sealed at 330. In either case, multilayer membrane assembly 320 may be sealed against support tube 310 at each end in the nonporous zone as described hereinabove. This sealing may be effected via welding or a clamp arrangement. In the planar configuration, the support is nonporous around the edges and just inside the sealed area it is porous. In a planar configuration, for example, both the multilayer membrane and the porous support are rectangular, the multilayer membrane is sealed against the porous support around the edges. This may be done by any method known to one of skill in the art, such as, for example, with a weld around the periphery or a stacking clamp arrangement.

One advantage of the use of multilayer membranes with a porous support is that the bulk hydrogen transport layer will prevent gases that pass through any thin outer catalyst layer from passing through the assembly. The use of a SMM may prevent/ameliorate ballooning out of the multilayer membrane that may occur with increasing hydrogen partial pressure. The incorporation of such a porous support may be especially desirable for use with membranes having very high permeability to hydrogen such as Ni which has a permeability to hydrogen ten times that of Pd; thus the required surface area for a given application may be reduced. The use of a support may also enable the use of less costly materials than Pd, such as, for example, Ta and Ni. The porous support may be selected such that the coefficient of thermal expansion of the porous support is similar to the combined expansion of the multilayer membrane caused by temperature and hydrogen-induced swelling so that an effective seal is maintained between the support and the multilayer membrane assembly.

The hydrogen separation membrane reactor is typically operated at temperatures from 200° C. to 500° C. and all individual values and ranges therein. In one embodiment, the hydrogen separation membrane reactor is operated at temperatures above about 220° C. In one embodiment, the hydrogen separation membrane reactor is operated at temperatures above about 250° C. In one embodiment, the hydrogen separation membrane reactor is operated at temperatures above about 300° C. In one embodiment, the hydrogen separation membrane reactor is operated at temperatures between 320° C. and 400° C.

The hydrogen separation membrane reactor is typically operated at inlet pressures of ambient to 1000 psig and all individual values and ranges therein, including 300 psig to 1000 psig. The permeate (hydrogen-rich stream) pressures range from 0 psig to 1000 psig, and all intermediate values and ranges therein, depending on the desired output pressure. In embodiments, the permeate pressure is from 100 psig to 270 psig.

In an embodiment, the feed stream comprises hydrogen and carbon dioxide and the hydrogen recovery from the hydrogen separation membrane reactor is greater than 70% by volume. In one embodiment of this invention, the feed stream comprises hydrogen and carbon dioxide and the hydrogen recovery from the hydrogen separation membrane reactor is greater than 80% by volume. In one embodiment of this invention, the feed stream comprises hydrogen and carbon dioxide and the hydrogen recovery from the hydrogen separation membrane reactor is greater than 90% by volume.

The $H_2$ flux across the hydrogen separation membrane is greater than 5 mL/min/cm$^2$ (STP) and is preferably as high as possible. All individual values and ranges in the range from 5 mL/min/cm$^2$ to 500 mL/min/cm$^2$ are intended to be included as if individually listed. In preferred embodiments, the $H_2$ flux across the hydrogen separation membrane is within the range of from 50 mL/min/cm$^2$ to 200 mL/min/cm$^2$ at STP. In one embodiment the $H_2$ flux across the membrane is greater than 10 mL/min/cm$^2$ (STP). In one embodiment, the $H_2$ flux across the membrane is greater than 20 mL/min/cm$^2$ (STP. In one embodiment, the $H_2$ flux across the membrane is greater than 25 mL/min/cm$^2$ (STP). In one embodiment, the $H_2$ flux across the membrane is greater than 40 mL/min/cm$^2$ (STP). In one embodiment, the $H_2$ flux across the membrane is greater than 50 mL/min/cm$^2$ (STP).

The methods of the present disclosure may be useful for separating hydrogen from impure hydrogen streams continuously for long durations, as further discussed in Example 3 hereinbelow. In an embodiment, the method of the present disclosure is used to separate hydrogen from a WGS reaction mixture and the $H_2$ flux across the HTM is greater than 10 mL/min/m$^2$ (STP) a continuous duration greater than 24 hours, alternatively for a duration greater than 108 hours, alternatively for a duration greater than 700 hours, alternatively greater than 2800 hours.

EXAMPLES

Example 1

Membrane Pretreatment

Prior to use in a hydrogen separation process, the membranes to be used are pretreated. Although applicant does not wish to be bound by theory, it is believed this pretreatment process minimizes the mechanical stress the membrane undergoes under actual operating conditions and improves the lifetime of the membrane and the performance of the membrane. Without this pretreatment procedure, the membrane will break at about 5 psig to 10 psig of outlet hydrogen pressure. The following description illustrates one specific example of the pretreatment procedure. Other specific useful process parameters, such as different reaction times, temperatures, membrane materials, pressures, and gases, are easily determined by one of ordinary skill in the art using the description provided herein without undue experimentation.

A vanadium membrane having a 7/8" diameter was punched out from a sheet of V (about 130 microns thick, obtained from Aldrich) and cleaned with solvent (methanol, for example), and a low-power plasma. A surface catalyst (Pd, for example) was vapor deposited to the desired thickness (300 nm to 500 nm, for example) on both sides of the membrane. The membrane flanged (with a 5/8" opening inside a copper gasket) in the desired reactor was first heated to the desired operating temperature (about 400° C.) overnight under flowing inert gas (He or Ar, for example) at ambient pressure. Then, the feed side pressure was increased using helium to 450 psig in about 30 minutes, and then held at 450 psig for 15 minutes. This step is referred as pre-deformation. The surface of the membrane is visually different than a non-treated membrane after this pre-deformation step. For example, the surface may look concave. After pre-deformation, the feed pressure was decreased to ambient pressure in about 10 minutes. At ambient pressure, an oxidizing agent such as air, oxidizing contaminants at the membrane surface, oxygen, hydrogen peroxide, ozone, or others as known in the art was introduced to both sides of the membrane for 15 minutes to burn out any impurity that may have accumulated on the Pd surface during the startup. In this example, air was used. This step is referred as air-baking or surface catalyst activation step. The air-baking step is optional, but is useful in achieving higher hydrogen flux.

Vanadium alloys may improve the resistance of the membrane to hydrogen embrittlement, but may be easily contaminated by oxygen and carbon during their fabrication. The H transport layer of the membrane used in these experiments has a low amount of oxygen (about 200 ppmw) and carbon (about 100 ppmw) impurities.

After purging the oxygen out with inert gas in both chambers of the reactor, a hydrogen feed stream (60% $H_2$-40% He) was introduced to the feed chamber and Ar was used as the sweep gas at the beginning of the experiment to collect a few permeation data points to ensure good membrane performance and a gas tight seat were achieved. Reaction temperatures were 380° C./400° C. on the feed and permeate sides of the membrane respectively.

Feed pressure was subsequently increased to 50 psig and permeate pressure (pure hydrogen no sweep at the permeate side) was increased to 18 psig (2 bara). Sweep argon gas was turned off, and feed pressure was increased slowly to 450 psig (about 5 psig/min.).

Figure 7:
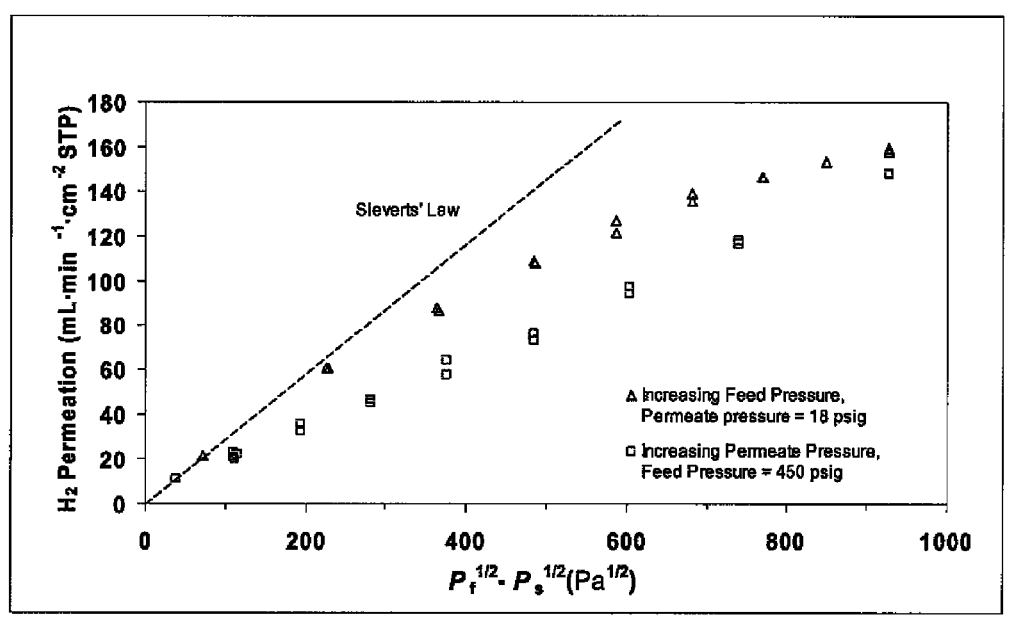
FIG. 7 is a plot of flux of hydrogen through a composite hydrogen transport membrane, HTM, as a function of the difference of the square roots of the inlet and outlet partial pressures of $H_2$.

Permeation data were collected at 50 psig increments, as shown in FIG. 7, which is a plot of flux of hydrogen through the composite HTM as a function of the difference of the square roots of the inlet and outlet partial pressures of $H_2$. The triangles represent data obtained while the outlet pressure was held at 18 psig and the inlet pressure was increased to 450 psig. Deviation from Sieverts' law at high pressure is believed caused by slow $H_2$ gas diffusion through a $H_2$-depleted gas layer on the membrane surface.

The second set of data (squares) was collected with the feed pressure holding at 450 psig and permeate pressure slowly increasing from 18 psig to 270 psig (1 psig/min.). As the permeate pressure increased, the hydrogen flux decreased due to decreasing hydrogen partial pressure differential across the membrane.

Under these conditions, an essentially 100% pure hydrogen stream at an outlet pressure of 250 psig (18 bara) was obtained at a flux rate of 11 sccm/cm$^2$; an essentially 100% pure hydrogen stream at an outlet pressure of 105 psig (8 bara) was obtained at a flux rate of 75 sccm/cm$^2$; and an essentially 100% pure hydrogen stream at an outlet pressure of 18 psig (2 bara) was obtained at a flux rate of 147 sccm/cm$^2$. The pretreated membrane sustained 450 psig of feed pressure and 250 psig of permeate pressure over 12 hours without failure. It is thus illustrated that the membrane may exhibit a selectivity to hydrogen of greater than 99% via embodiments of the described method.

Example 2

Integrated WGS and HTM

Two lab-scale IWGSMR modules, respectively accommodating one and two hydrogen transport membranes, were designed, fabricated and assembled. The reactor modules were fabricated from stainless steel flanges of 2.75" diameter. The membrane fitting into the 2.75" flanges have a diameter of 1.89". The copper gaskets used had an inner diameter of 1.45" providing an active membrane surface area of 10.6 square centimeters (1.65 square inch) for each membrane. It was found that commercial Cr/Fe oxide-based water-gas shift catalyst (C12-4-02 from Süd-Chemie) was compatible with the hydrogen transport membranes constituted with surface Pd catalysts when the fresh commercial WGS catalyst was pre-treated in a hydrogen-stream (1:5 molar ratio) for one week to remove residual sulfate. The Cr/Fe oxide catalyst was packed in close proximity to the membrane surface without touching the membrane surface.

Optimized operating parameters, including composition and gas hourly space velocity "GHSV") of the feed stream, pressure, and temperature, were identified for the IWGSMR as known to one of skill in the art.

Figure 8:
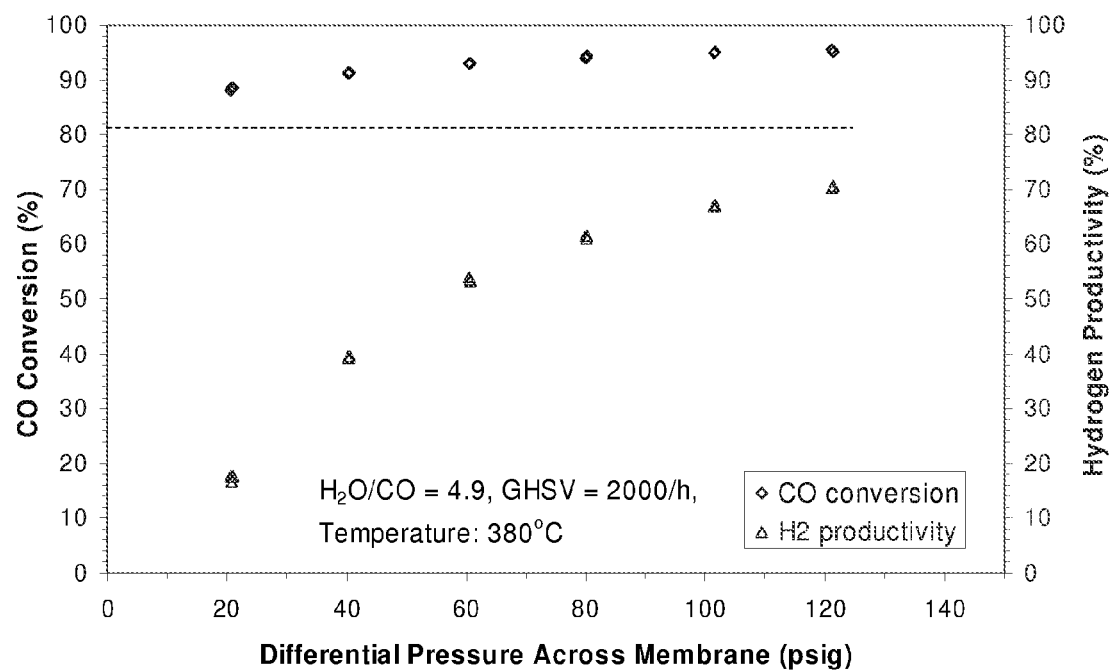
FIG. 8 is a plot of CO conversion and $H_2$ productivity each as a function of the differential pressure across a composite hydrogen transport membrane of an integrated WGS-hydrogen transport membrane reactor.

FIG. 8 is a plot of CO conversion and $H_2$ productivity each as a function of the differential pressure across the composite hydrogen transport membrane. Each data point is steady-state data at a different inlet pressure to the HTM. The feed stream contains 47.8 mol % $H_2$, 6.2 mol % $CO_2$, 7.8 mol % CO, and 38.2 mol % steam. A pure hydrogen stream with a flow rate of 390 sccm was obtained from the permeate side of the reactor. The dashed line indicates the theoretical CO conversion (81%) based upon the thermodynamic equilibrium without $H_2$ removal (82% CO conversion equals 1.5% outlet CO concentration).

$H_2$ productivity is here defied as the amount of $H_2$ removed as permeate divided by the inlet $H_2$+CO: Productivity (%)=100×permeated $H_2$/(fed $H_2$+fed CO). Thus, if all the CO is shifted to $CO_2$ and all of the hydrogen came across the membrane, the productivity is 100%. If all the CO is converted to $CO_2$ and none of the hydrogen comes across the membrane, the productivity is 0%. Thus, the hydrogen productivity combines the amount of shift and the amount of transport of hydrogen across the membrane.

As seen in FIG. 8, CO conversion of about 96% and hydrogen productivity of about 70% were achieved when the dual-stack IWGSMR was operated at 120 psig on the feed side and ambient pressure on the permeate side without a sweep stream.

By comparison, a large amount of steam corresponding to a $H_2O$:CO ratio of 20:1 would be required at 380° C., or a temperature below 260° C. would be required to achieve a 96% conversion of CO with the same amount of steam under an equilibrium condition. Significantly less steam is required for hydrogen production using a WGS shift reactor integrated with a hydrogen separation membrane system compared with a conventional high-temperature WGS reactor.

Example 3

Long-Term Separation of $H_2$ from WGS Gas with HTM

Figure 9:
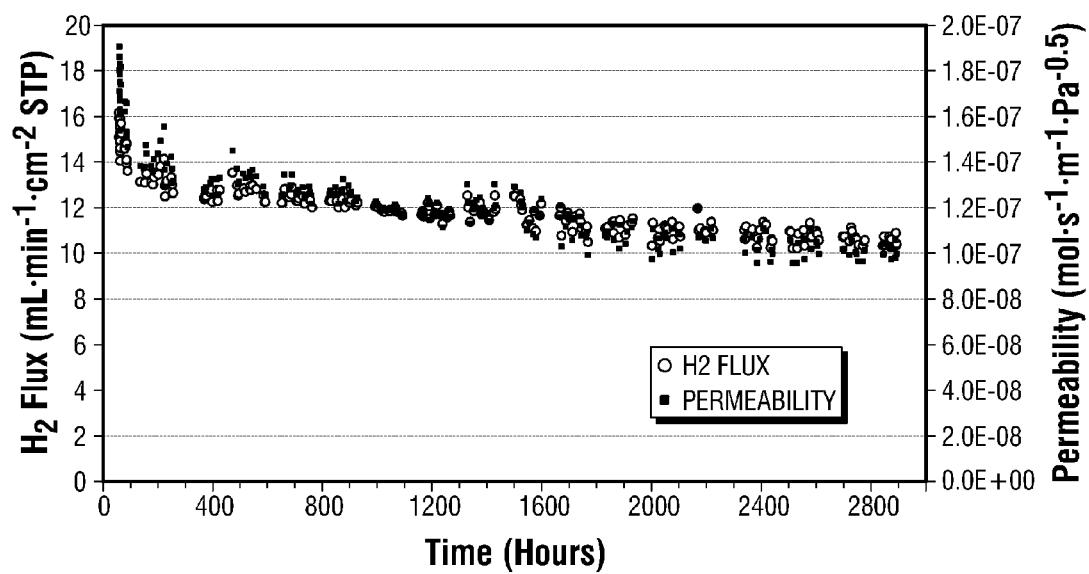
FIG. 9 is a plot of hydrogen flux through a composite HTM as a function of time.

A composite HTM was tested at ambient pressure with a full mixture of water-gas shift gas containing 41.4% $H_2$, 3.3% CO, 17.8% $CO_2$, 37.3% steam and balance of inert gases in volume at 340° C. The feed side reactor compartment was packed with low-temperature water-gas shift catalyst (Cu/ZnO obtained from Süd Chemie) as the guard bed. FIG. 9 is a plot of hydrogen flux through a composite HTM as a function of time. As shown in FIG. 9, the membrane displayed an initial hydrogen flux of approximately 14 mL·min$^{-1}$·cm$^{-2}$ (STP), corresponding to an apparent hydrogen permeability of $1.4\times10^{-7}$ mol·m$^{-1}$·s$^{-1}$·Pa$^{-0.5}$. After four months (approximately 2,800 hrs) of continuous operation in the full water-gas shift mixture, the composite membrane maintained about 10 mL·min$^{-1}$·cm$^2$ (STP) of hydrogen flux and an apparent permeability of $1.0\times10^{-7}$ mol·m$^{-1}$·s$^{-1}$·Pa$^{-0.5}$, which is better than unalloyed palladium.

U.S. Pat. No. 6,899,744 and U.S. published application 2004/0129135 and 20050241477 are incorporated by reference to the extent not inconsistent with the disclosure herein, including for useful catalyst materials, membrane materials, membrane reactors, methods and other purposes. When a group of substituents is disclosed herein, it is understood that all individual members of those groups and all subgroups, including any isomers and enantiomers of the group members, and classes of compounds that can be formed using the substituents are disclosed separately. When a Markush group or other grouping is used herein, all individual members of the group and all combinations and subcombinations possible of the group are intended to be individually included in the disclosure.

While preferred embodiments of the methods have been shown and described, modifications thereof can be made by one skilled in the art without departing from the spirit and teachings of the present disclosure. The embodiments described herein are exemplary only, and are not intended to be limiting. Many variations and modifications of the methods disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for separating a hydrogen-rich product stream from a feed stream comprising hydrogen and at least one carbon-containing gas, the method comprising:
  feeding the feed stream, at an inlet pressure greater than atmospheric pressure and a temperature greater than 200° C., to a hydrogen separation membrane system comprising a pretreated membrane that is selectively permeable to hydrogen, and producing a hydrogen-rich permeate product stream on the permeate side of the membrane and a carbon dioxide-rich product raffinate stream on the raffinate side of the membrane;

wherein the pretreated membrane is pretreated by the steps comprising heating the membrane to a desired temperature and desired pressure in a flow of inert gas for a sufficient time to cause the membrane to mechanically deform, decreasing the pressure to approximately ambient pressure; and optionally, chemically treating the membrane before, during, or after deformation of the membrane; and wherein the hydrogen flux through the membrane is greater than 20 mL/min/cm$^2$ at standard temperature and pressure.

2. The method of claim 1, wherein the hydrogen-rich permeate product stream is greater than 99% by volume hydrogen.

3. The method of claim 1, wherein the carbon dioxide-rich raffinate product stream has a pressure greater than 400 psig.

4. The method of claim 1 wherein the hydrogen separation membrane system comprises a membrane having a hydrogen transport layer.

5. The method of claim 4 wherein the membrane is a multilayer membrane further comprising at least one outer catalyst layer.

6. The method of claim 4 wherein the multilayer membrane comprises a hydrogen dissociation catalyst outer layer on the raffinate side of the membrane and a hydrogen desorption catalyst outer layer on the permeate side of the membrane.

7. The method of claim 6 wherein the hydrogen desorption catalyst outer layer is not the same material as the hydrogen dissociation catalyst outer layer.

8. The method of claim 4 wherein the membrane has a thickness of from about 50 micrometers to about 1000 micrometers.

9. The method of claim 5 wherein the at least one outer catalyst layer has a thickness of from about 1 nm to about 1500 nm.

10. The method of claim 4 wherein the hydrogen transport layer comprises a metal selected from the group consisting of V, Nb, Ta, Zr, and alloys thereof.

11. The method of claim 4 wherein the hydrogen transport layer comprises a material selected from cermets and proton conducting ceramics.

12. The method of claim 10, wherein the hydrogen transport layer comprises about 90% V and about 10% Ni.

13. The method of claim 5, wherein the at least one outer catalyst layer comprises a metal selected from the group consisting of Pd and alloys thereof.

14. The method of claim 13 wherein at least one catalyst outer layer comprises an alloy of palladium with a metal selected from the group consisting of Ag, Cu, Au, Pt, and combinations thereof.

15. The method of claim 14 wherein the at least one catalyst outer layer retains catalytic activity for feed streams comprising up to 20 ppm S.

16. The method of claim 5 wherein the multilayer membrane comprises a hydrogen transport layer comprising a metal selected from the group consisting of V, Nb, Ta, Zr and alloys thereof; and at least one catalyst outer layer comprising a metal selected from the group consisting of Pd and alloys thereof.

17. The method of claim 16 wherein the at least one outer catalyst layer comprises a Pd—Cu alloy.

18. The method of claim 17 wherein the at least one catalyst layer comprises about 70% Pd and about 30% Cu.

19. The method of claim 1, wherein the feed stream comprises hydrogen and carbon dioxide and the hydrogen recovery is greater than 70% by volume.

20. The method of claim 1, wherein the feed stream comprises hydrogen and carbon dioxide and the hydrogen recovery is greater than 90% by volume.

21. The method of claim 1, wherein the hydrogen separation membrane system has a hydrogen flux through the membrane of greater than 50 mL/min/cm$^2$ at standard temperature and pressure.

22. The method of claim 5 wherein the hydrogen separation membrane system has selectivity to hydrogen of greater than 99%.

23. The method of claim 1 wherein the hydrogen-rich permeate product stream has a hydrogen partial pressure of at least 20 psig, and the carbon dioxide-rich raffinate product stream has a total pressure of at least 200 psig.

24. The method of claim 1 wherein the operating temperature is in the range from about 200° C. to about 500° C.

25. The method of claim 1 wherein the operating temperature is in the range from about 300° C. to about 400° C.

26. The method of claim 1 wherein the membrane system is operated in the range of from about 300 psig to about 1000 psig and the pressure on the permeate side of the membrane is in the range of from about 0 psig to about 1000 psig.

27. The method of claim 1 wherein the membrane system is operated in the range of from about 300 psig to about 1000 psig and the pressure on the permeate side of the membrane is in the range of from about 100 psig to about 500 psig.

28. The method of claim 22 wherein the hydrogen separation membrane has a hydrogen flux through the membrane of greater than 20 mL/min/cm$^2$ and the pressure on the permeate side of the membrane is greater than 100 psig.

29. The method of claim 1 further comprising recycling the carbon dioxide-rich product raffinate stream to the hydrogen separation membrane system.

30. The method of claim 1 wherein the hydrogen separation membrane system does not require a permeate side sweep gas.

31. The method of claim 1 further comprising sweeping the hydrogen-rich permeate product stream with an inert permeate side sweep gas.

32. The method of claim 31 further comprising combusting the hydrogen-rich permeate product stream to produce electricity.

33. The method of claim 31 wherein the inert permeate side sweep gas is nitrogen.

34. The method of claim 1 wherein the feed stream is a water gas shift reaction mixture comprising hydrogen, carbon monoxide and carbon dioxide and the flux of hydrogen through the hydrogen separation membrane system is greater than about 20 mL/min/cm$^2$ for a continuous operation duration of greater than 1000 hours.

35. The method of claim 3 further comprising feeding the carbon dioxide-rich product raffinate stream to a second hydrogen separation membrane system comprising a second membrane that is selectively permeable to hydrogen, and producing a second hydrogen-rich permeate product stream on a permeate side of the second membrane and a second carbon dioxide-rich product raffinate stream on a raffinate side of the second membrane.

36. The method of claim 35 where the said second carbon dioxide-rich product raffinate stream is further processed in a third hydrogen separation membrane system comprising a third membrane that is selectively permeable to hydrogen.

37. The method of claim 1, further comprising producing the feed stream by:
(a) reacting a carbonaceous feed with an oxidant to produce a first product stream comprising hydrogen and carbon monoxide at a pressure of above 200 psig;

(b) reacting the first product stream with a water-containing stream to produce the feed stream, wherein the feed stream comprises hydrogen, carbon monoxide and carbon dioxide at a temperature of from about 200° C. to about 500° C.

38. The method of claim 37 wherein the reacting the first product stream with a water-containing stream to produce the feed stream and feeding the feed stream, at a pressure above atmospheric pressure, to a hydrogen separation membrane system are carried out in a singular reactor.

39. The method of claim 38 wherein the conversion of carbon monoxide in the singular reactor is greater than 82%.

40. The method of claim 1 wherein the feed stream is a water gas shift reaction mixture comprising hydrogen, carbon monoxide and carbon dioxide and further comprising feeding the carbon dioxide-rich product raffinate stream to a water gas shift reactor.

41. The method of claim 37, further comprising separating at least one component from the feed stream prior to feeding the feed stream to the hydrogen separation membrane system.

42. The method of claim 41, wherein the at least one component is selected from surface catalyst poisons and water.

43. The method of claim 37, wherein the carbonaceous feed is selected from the group consisting of: natural gas, coal, petroleum coke, biomass and petroleum derived liquid fuel.

44. The method of claim 37, wherein the oxidant is selected from the group consisting of oxygen and water.

45. The method of claim 44, further comprising obtaining oxygen oxidant from air via an oxygen transport membrane.

46. The method of claim 1 wherein the membrane is supported by a porous support and the membrane comprises a hydrogen transport layer comprising a metal selected from the group consisting of V, Nb, Ta, Zr and alloys thereof; and at least one catalyst outer layer comprising a metal selected from the group consisting of Pd and alloys thereof.

47. The method of claim 46 wherein the porous support comprises a material selected from the group consisting of porous metal, porous refractory ceramic, metal mesh screen and combinations thereof.

48. The method of claim 46 wherein the porous support is a tube and the membrane encircles the porous support tube.

49. The method of claim 46 wherein the hydrogen transport layer has a thickness of less than 100 μm.

* * * * *